United States Patent [19]

McFadden

[11] 3,960,644

[45] June 1, 1976

[54] PIPE LINING APPARATUS

[76] Inventor: Eldon C. McFadden, 4107 Norris Ave., Sacramento, Calif. 95821

[22] Filed: Sept. 25, 1974

[21] Appl. No.: 509,222

[52] U.S. Cl. .............................. 156/390; 118/306; 118/323; 156/423; 156/578

[51] Int. Cl.$^2$ ....................... B05B 3/12; B32B 1/08; B32B 1/10

[58] Field of Search ............ 156/293, 294, 94, 287, 156/391, 500, 574–576, 423, 578; 285/370; 118/306, 323

[56] References Cited

UNITED STATES PATENTS

| | | | |
|---|---|---|---|
| 2,312,993 | 3/1943 | Stephens | 156/423 |
| 2,998,800 | 9/1961 | Vernooy | 118/306 |
| 3,080,269 | 3/1963 | Pollock et al. | 156/423 |
| 3,108,348 | 10/1963 | Schultz | 118/306 |
| 3,363,301 | 1/1968 | Delaruelle et al. | 156/294 |
| 3,753,766 | 8/1973 | Brown et al. | 118/306 |

*Primary Examiner*—William A. Powell
*Assistant Examiner*—M. G. Wityshyn
*Attorney, Agent, or Firm*—Blair & Brown

[57] ABSTRACT

A pipe lining apparatus for lining pipe in situ with a fiberglas reinforced plastic. The apparatus includes guide rollers for holding the apparatus centrally of the liner in the pipe as the apparatus is drawn through the pipe. Rotating sprays apply a resin and a resin hardening catalyst to the interior surface of the lining and a rubber tube following the spray heads forces the resin and catalyst into the fiberglas of the liner. Rotating rollers then apply pressure to the liner to force the liner into intimate contact with the pipe being lined. A finish coat of resin mixed with wax covered with the catalyst is then sprayed on the liner.

9 Claims, 24 Drawing Figures

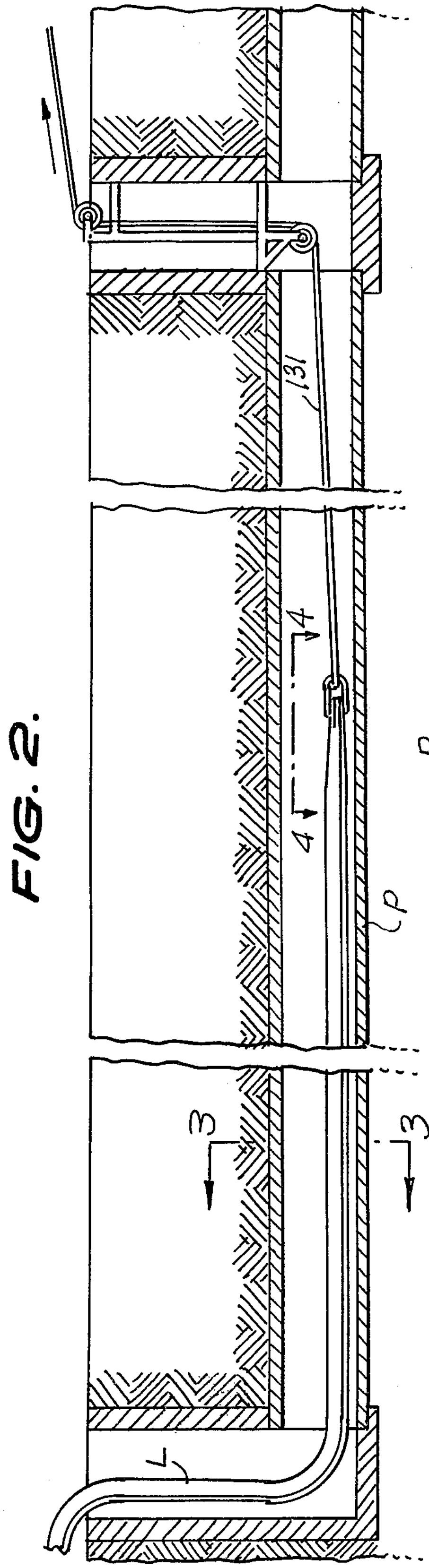
FIG. 2.
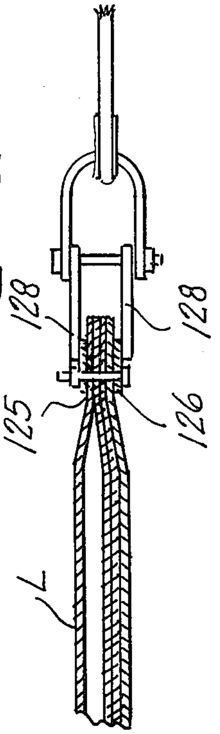
FIG.12.
FIG.11.
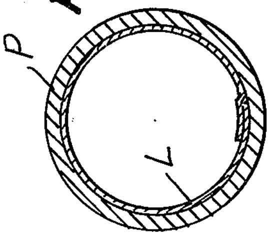
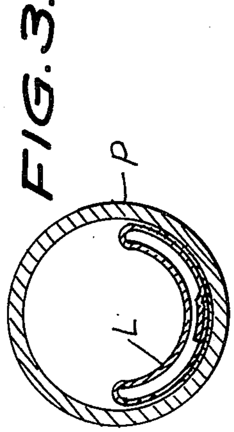
FIG.3.
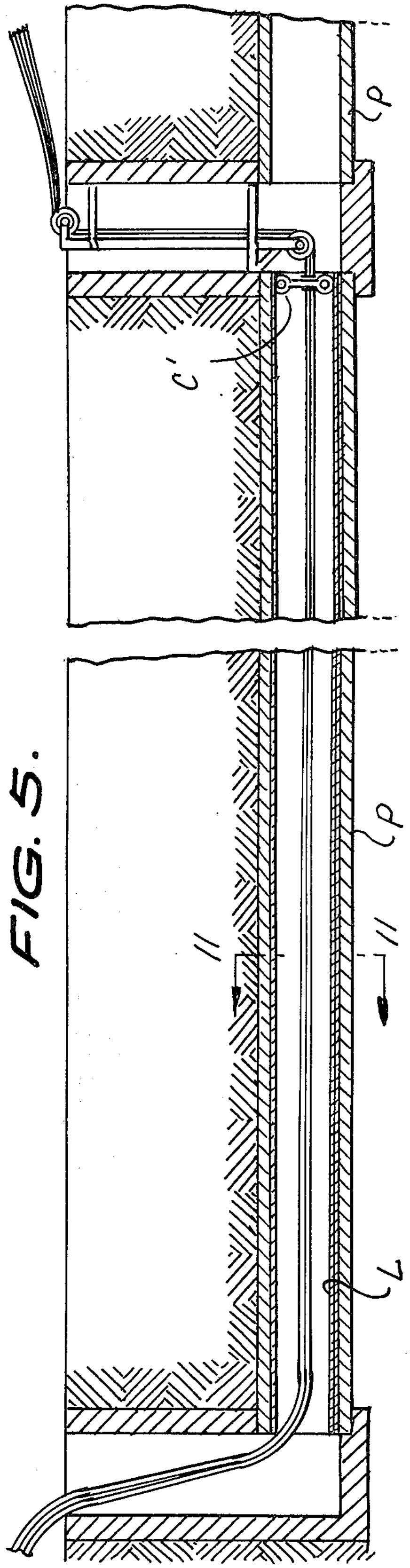
FIG. 5.

FIG. 6.
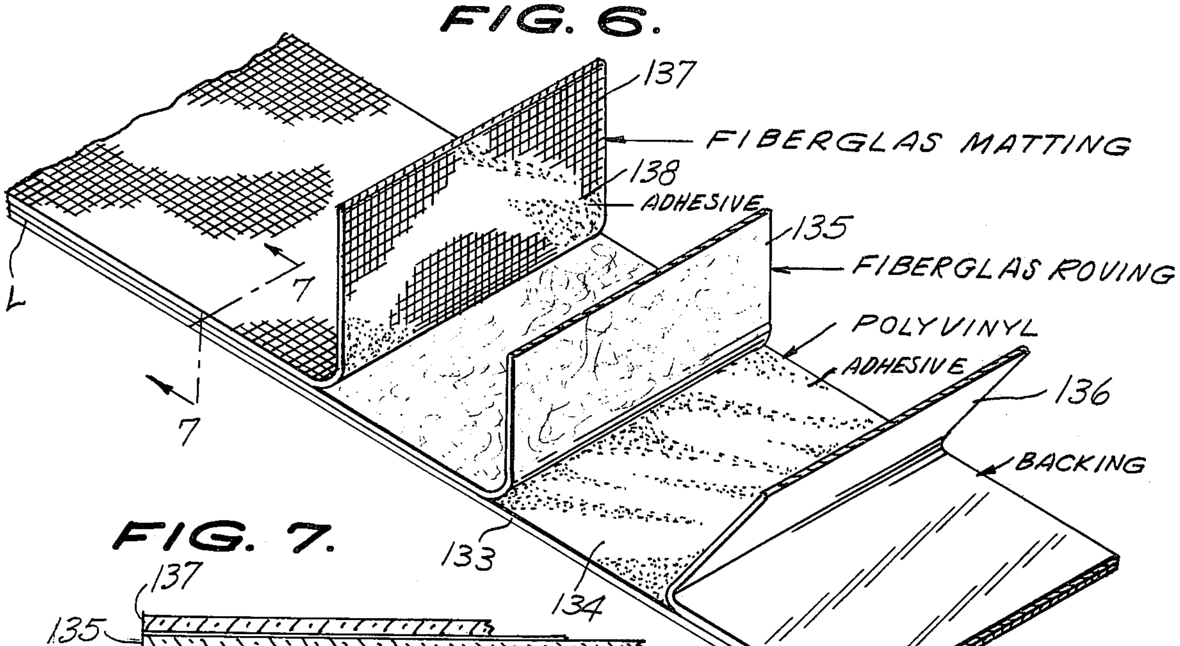
FIG. 7.
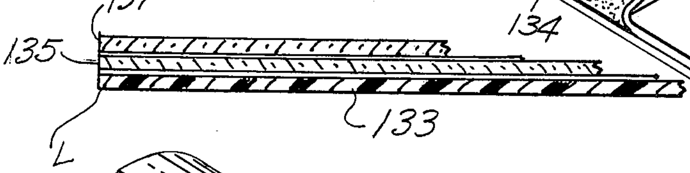
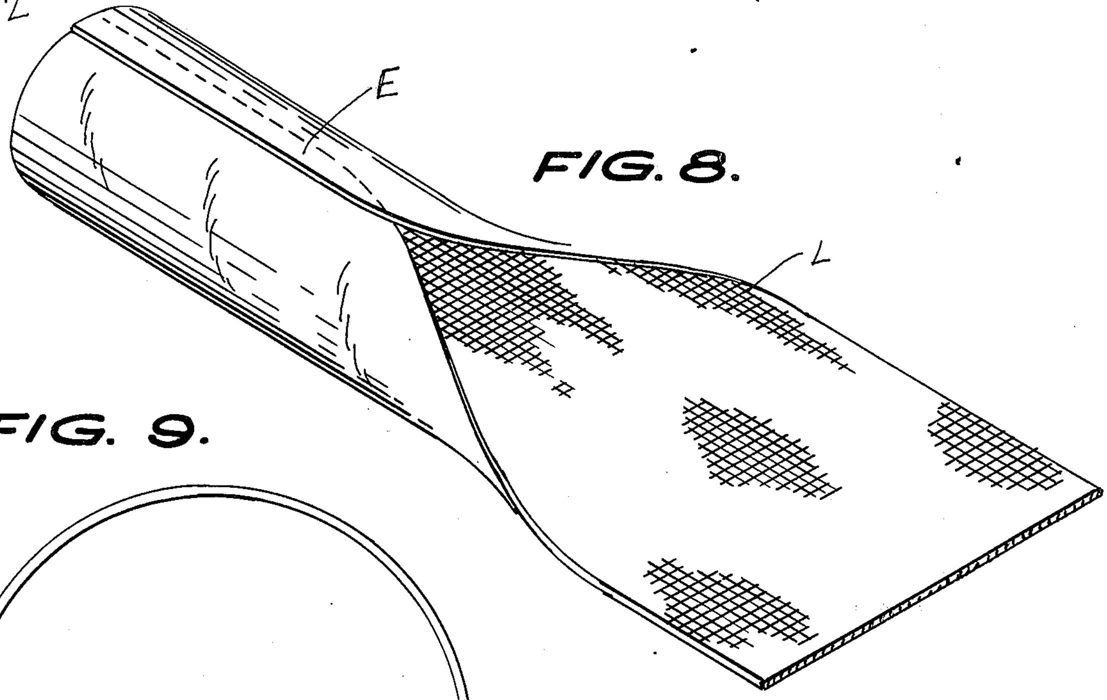
FIG. 8.
FIG. 9.
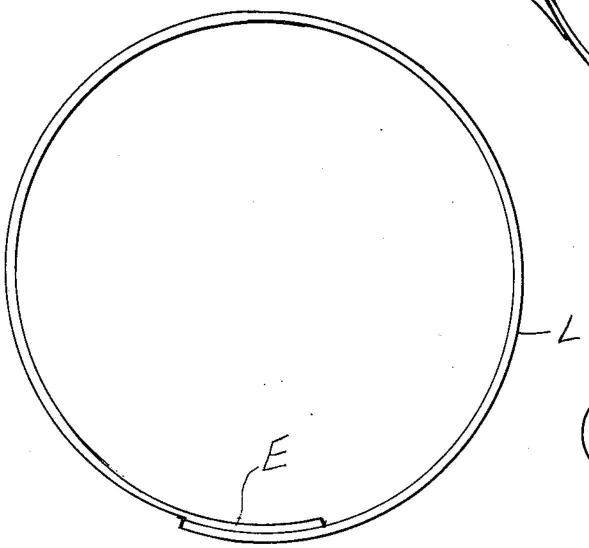
FIG. 10.
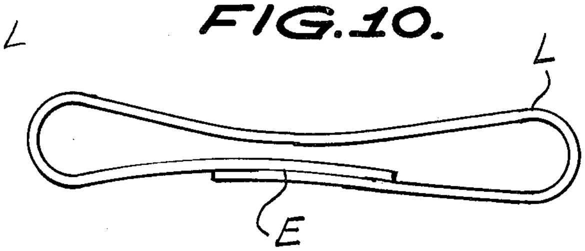

PIPE LINING APPARATUS

BACKGROUND OF THE INVENTION

1. Field of the Invention

The present invention relates to a pipe liner applying apparatus.

2. Summary of the Invention

The apparatus of the present invention includes a central hollow shaft having guide rollers engaging the inside of the liner in a pipe with the apparatus being moved through the pipe longitudinally. The central shaft includes rotating spray heads for spraying resin and catalyst onto the fiberglas liner and the mixture is forced into the liner by a tube engaged thereagainst. Rotating rollers on a longitudinal axis force the coated liner into intimate contact with the pipe being lined. Additional rotating spray heads spray a finish coat of resin mixed with wax and catalyst onto the liner.

The primary object of the invention is to provide an apparatus for lining a pipe in situ.

Other objects and advantages will become apparent in the following specification when considered in light of the attached drawings.

BRIEF DESCRIPTION OF THE DRAWINGS

FIG. 2 is a longitudinal sectional view of the liner being drawn into the pipe;

FIG. 3 is an enlarged transverse sectional view taken along the line 3—3 of FIG. 2, looking in the direction of the arrows;

FIG. 5 is a view similar to FIG. 2 with the lining completely in place;

FIG. 6 is a perspective view of the liner material;

FIG. 7 is an enlarged transverse sectional view taken along the line 7—7 of FIG. 6, looking in the direction of the arrows;

FIG. 8 is a perspective view of the liner illustrating how it is joined for use in the pipe;

FIG. 9 is an end elevation of the liner in expanded position;

FIG. 10 is an end elevation of the liner in collapsed position prior to installing in the pipe;

FIG. 11 is an enlarged transverse sectional view taken along the line 11—11 of FIG. 5, looking in the direction of the arrows;

FIG. 12 is a vertical sectional view taken along the line 12—12 of FIG. 4, looking in the direction of the arrows;

DESCRIPTION OF THE PREFERRED EMBODIMENT

Figure 1:
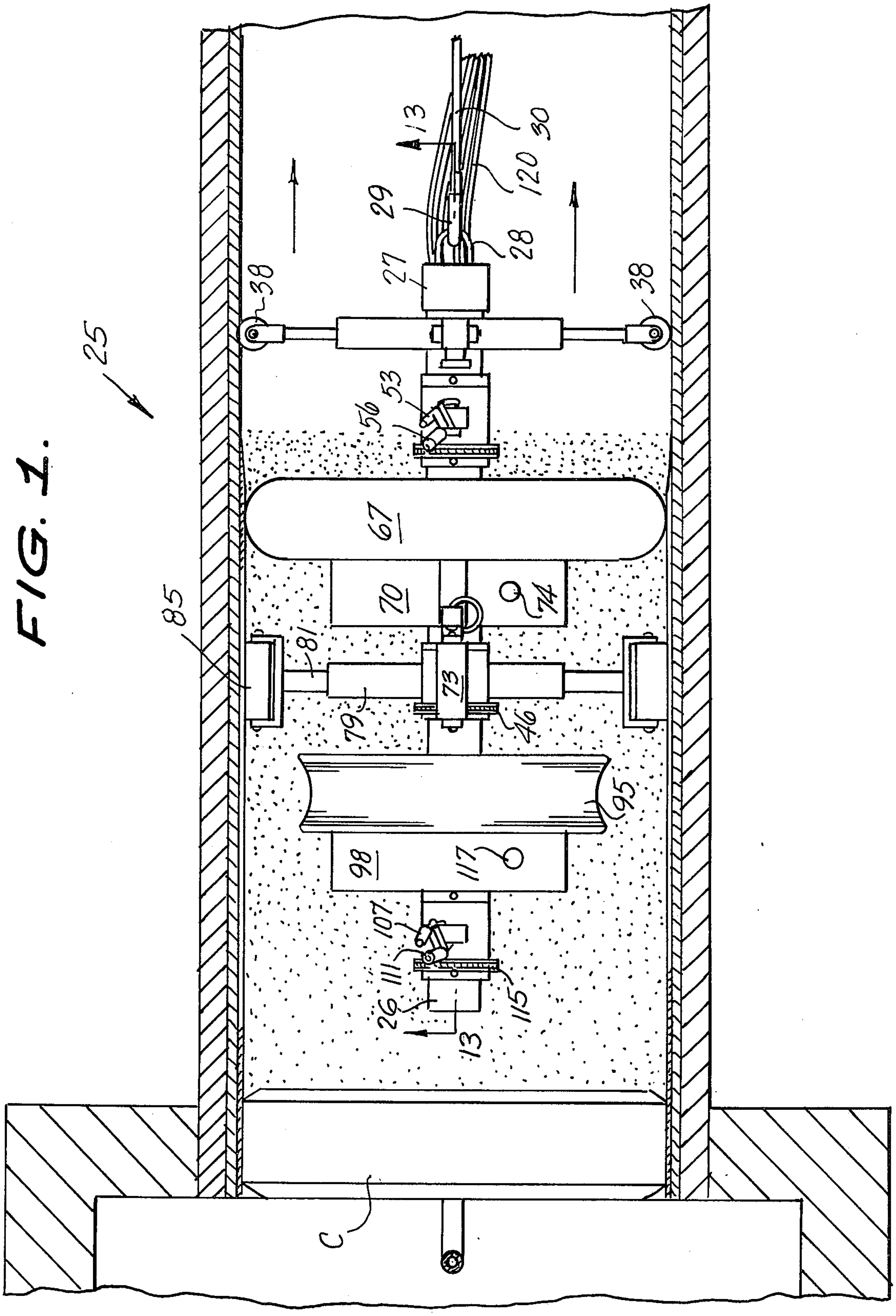
FIG. 1 is a side elevation of the invention shown in a pipe in liner applying position.
Figure 24:
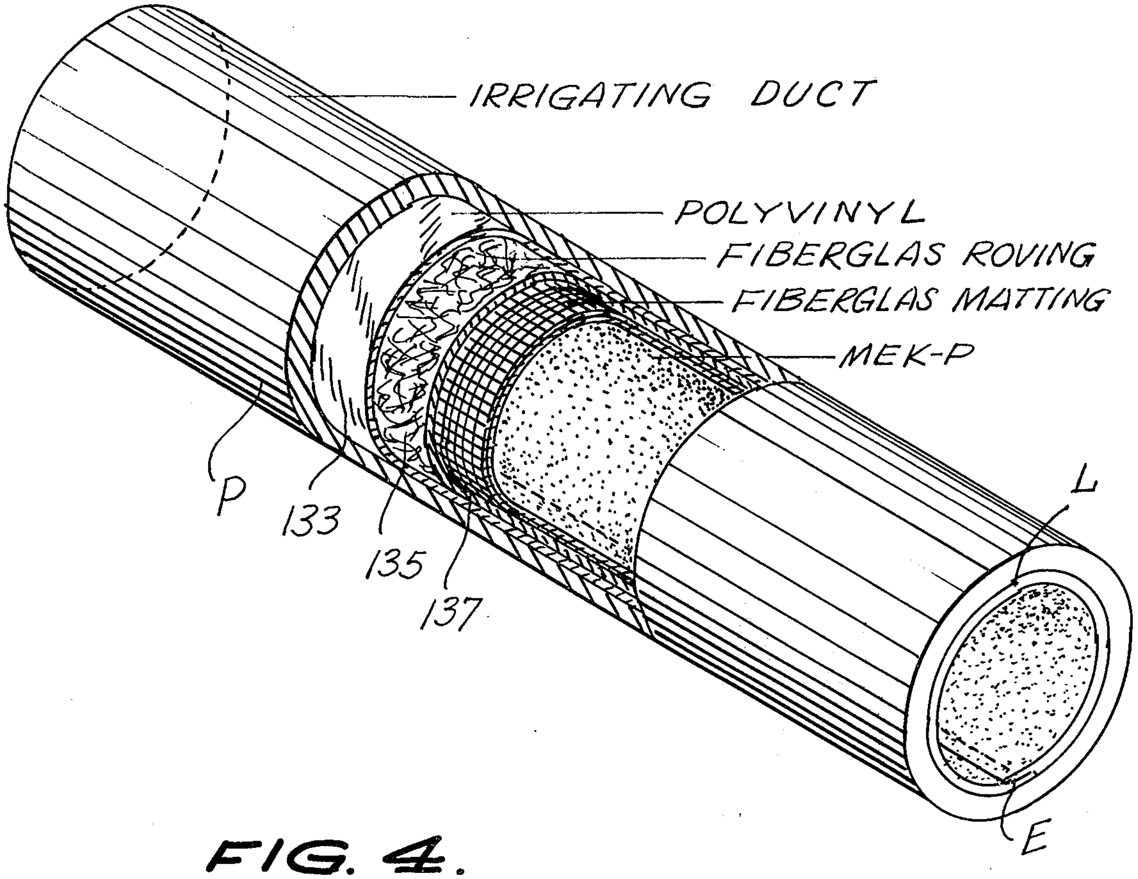
FIG. 24 is a perspective view of the lined pipe shown partially broken away and in section for convenience of illustration.

Referring now to the drawings in detail, wherein like reference characters indicate like parts throughout the several figures, the reference numeral 25 indicates generally, a pipe liner apparatus constructed in accordance with the invention.

Figure 13:
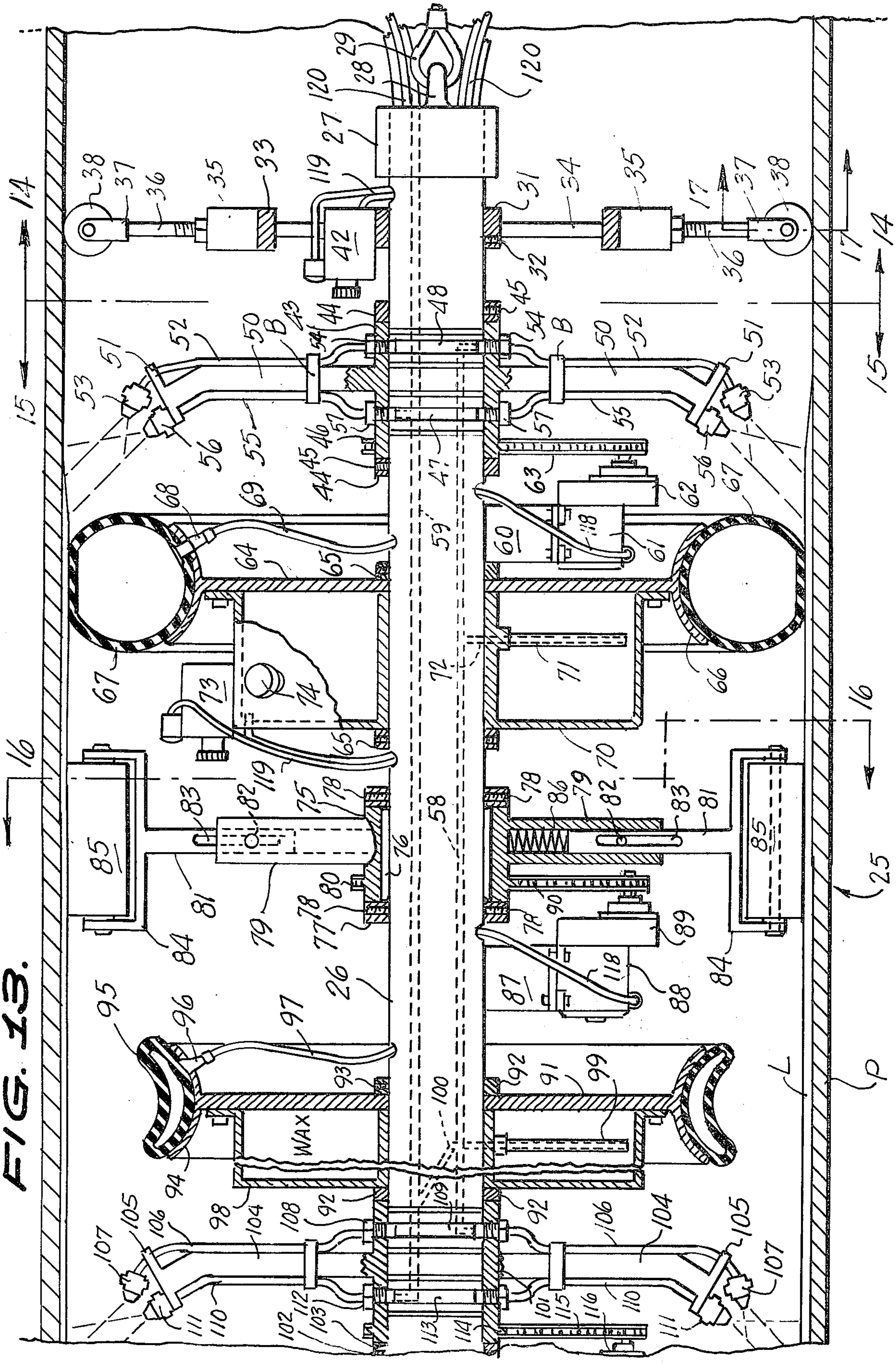
FIG. 13 is an enlarged longitudinal sectional view taken along the line 13—13 of FIG. 1, looking in the direction of the arrows.

The pipe liner apparatus 25 includes an elongate hollow shaft 26 having a collar 27 secured to one end thereof with a U-shaped eye 28 secured thereto. An eye 29 of a pulling cable 30 is linked to the eye 28 as can be seen in FIGS. 1 and 13.

Figure 14:
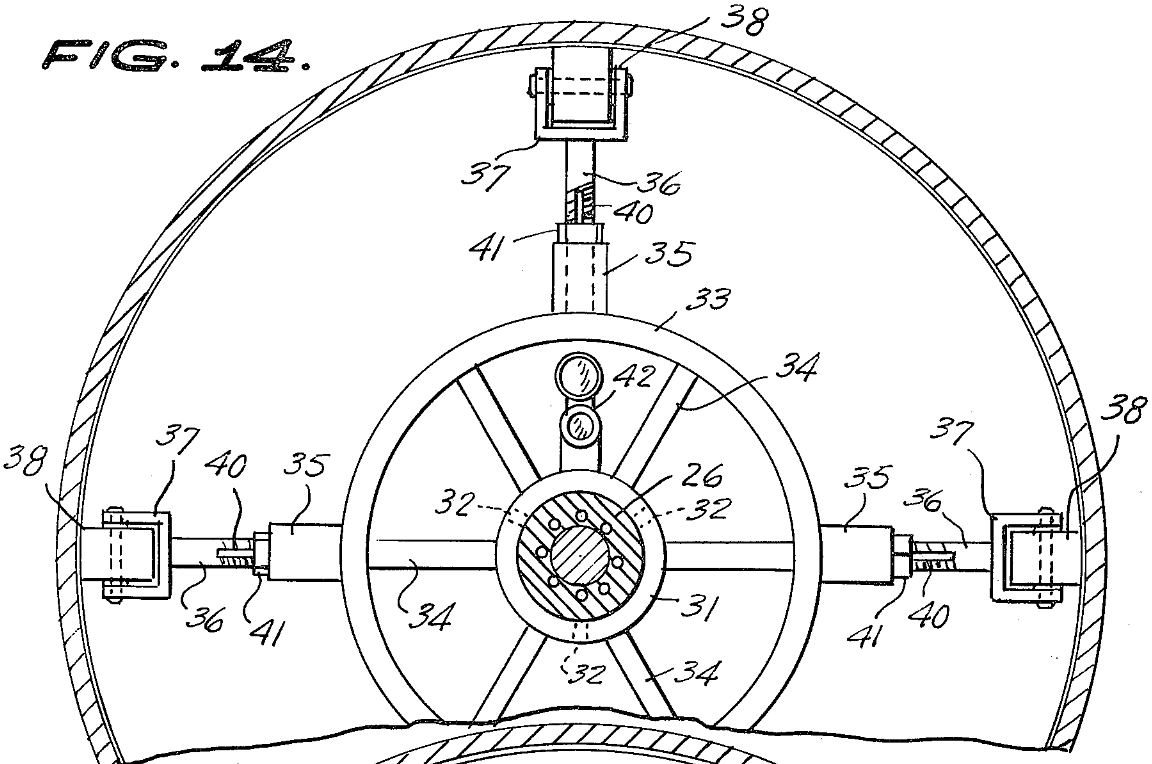
FIG. 14 is a fragmentary transverse sectional view taken along the line 14—14 of FIG. 13, looking in the direction of the arrows.
Figure 15:
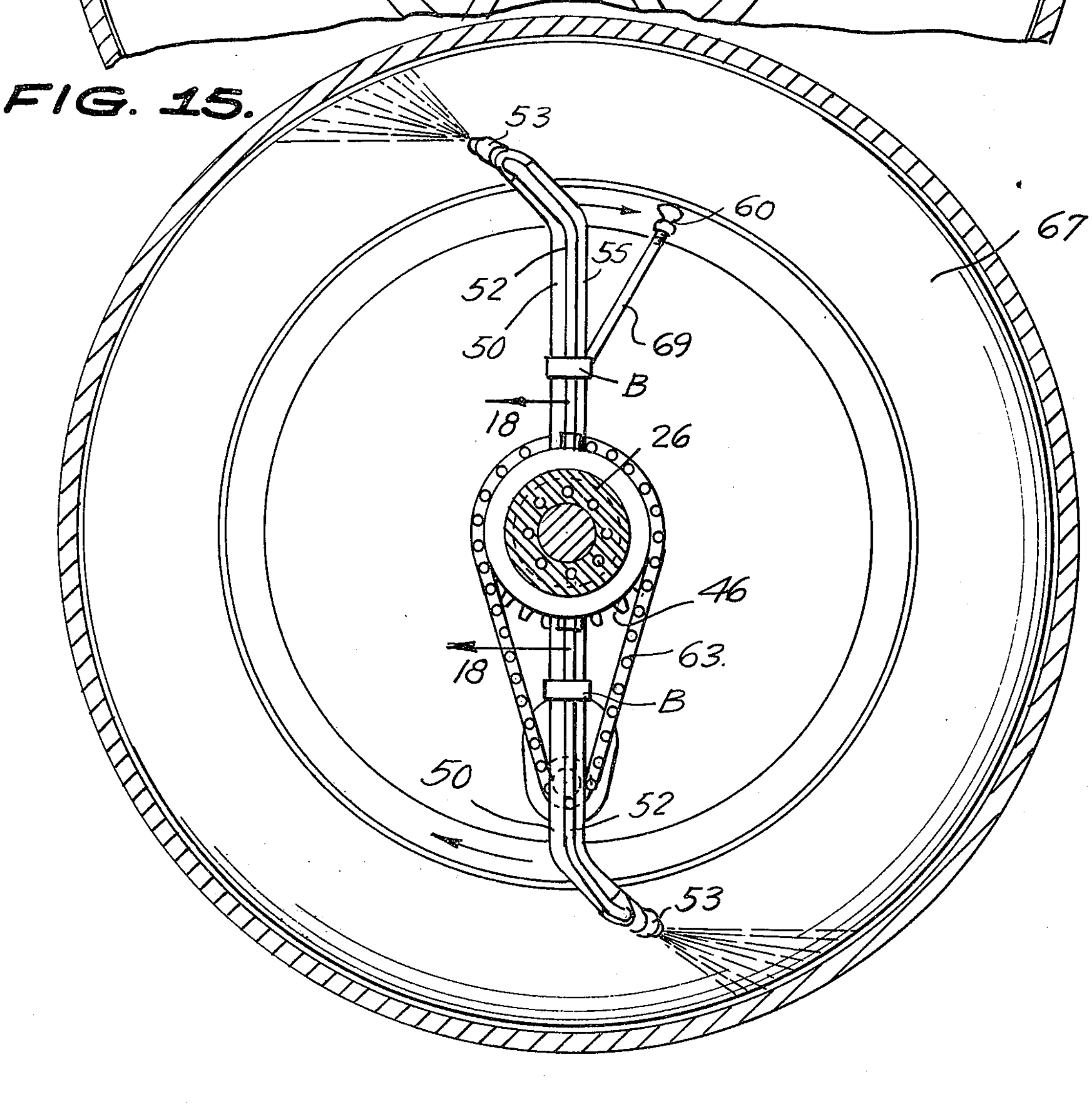
FIG. 15 is a transverse sectional view taken along the line 15—15 of FIG. 13, looking in the direction of the arrows.
Figure 16:
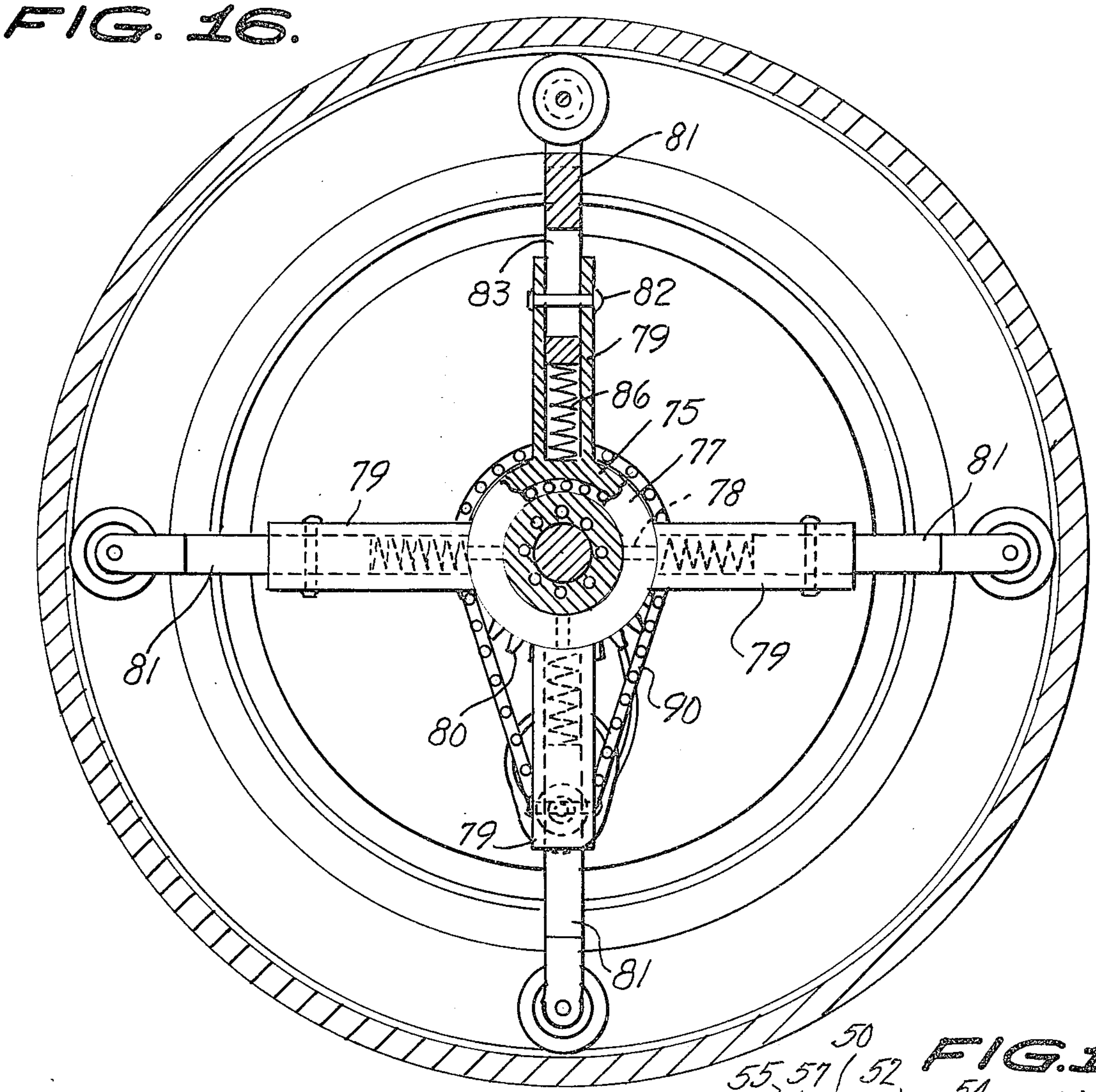
FIG. 16 is a transverse sectional view taken along the line 16—16 of FIG. 13, looking in the direction of the arrows.
Figure 17:
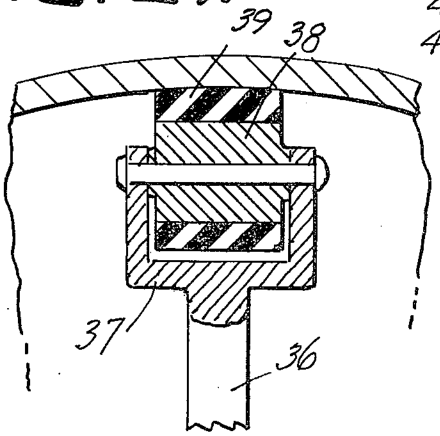
FIG. 17 is an enlarged fragmentary transverse sectional view taken along the line 17—17 of FIG. 13, looking in the direction of the arrows.
Figure 18:
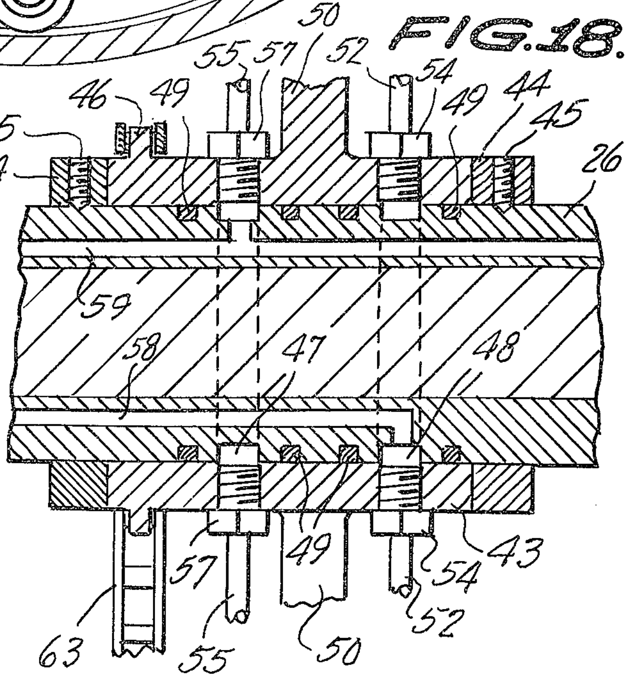
FIG. 18 is an enlarged fragmentary longitudinal sectional view taken along the line 18—18 of FIG. 15, looking in the direction of the arrows.
Figure 21:
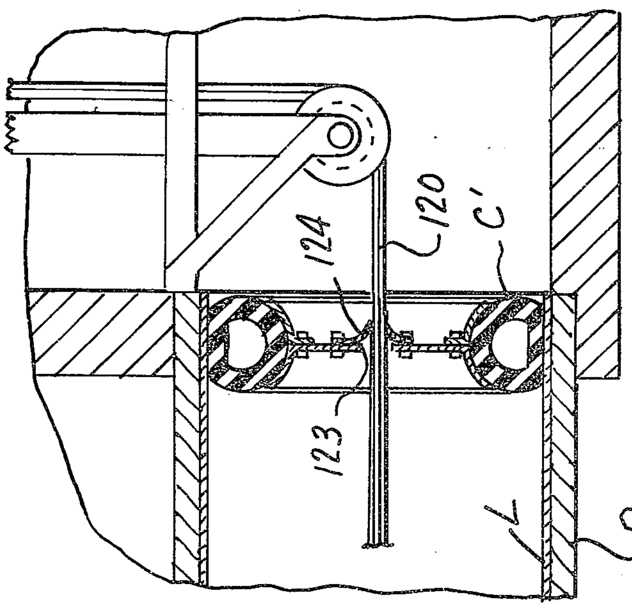
FIG. 21 is an enlarged fragmentary longitudinal sectional view taken along the line 21—21 of FIG. 20, looking in the direction of the arrows.
Figure 20:
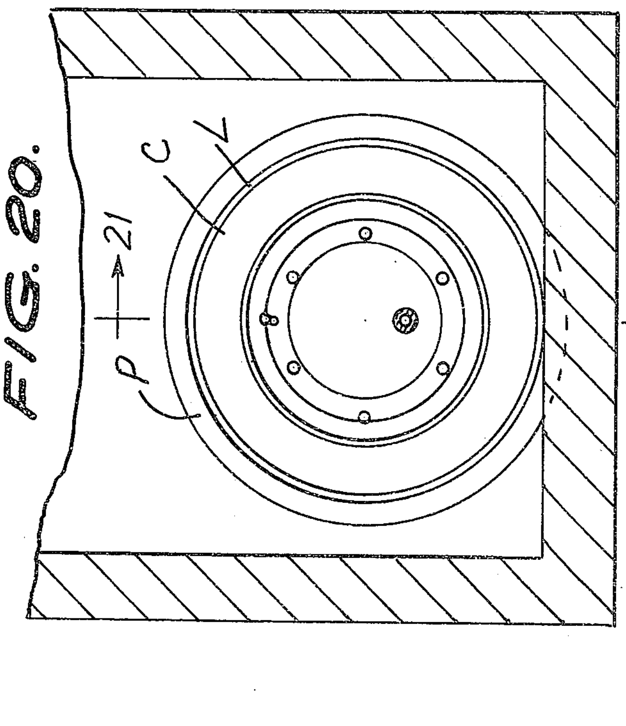
FIG. 20 is an end elevation of the structure illustrated in FIG. 19 taken along the line 20—20 of FIG. 19, looking in the direction of the arrows.

Adjacent the collar 27 a ring 31 is secured to the shaft 25 by means of set screws 32. A mounting ring 33 is positioned concentrically with the ring 31 and is secured thereto by a plurality of radial spokes 34. A plurality of socket members 35 are mounted on the mounting ring 33 and support radially adjustable shafts 36 extending radially outwardly therefrom. Each of the shafts 36 have a U-shaped yoke 37 mounted on the outer end thereof with a wheel 38 journalled therein. The wheels 38 have a relatively soft rubber tire 39 mounted thereon and adapted to conform to its support. The shafts 36 are threaded at 40 to receive adjusting nuts 41 as can be seen in FIG. 14. A closed circuit television camera 42 is mounted on the ring 31 to observe the action of the apparatus 25.

A sleeve 43 is journalled on the shaft 26 between a pair of collars 44 secured to the shaft 26 by set screws 45. The sleeve 43 includes a sprocket 46 for reasons to be assigned. The shaft 26 is provided with circumferential grooves 47, 48 lying within the sleeve 43 as can be seen in FIG. 13.

Sealing rings 49 engage in the outer surface of the shaft 26 on each side of the grooves 47, 48 to prevent leakage from the grooves 47, 48 along the shaft 26. A pair of oppositely extending arms 50 are secured to the sleeve 43 and extend radially outwardly therefrom carrying an angle bracket 51 on their outer ends. A conduit 52 has a spray head 53 secured to its outer end and has its inner end secured to the sleeve 43 by a fitting 54. The conduit 52 communicates with the groove 48. A conduit 55 is supported in the bracket 51 and has a spray head 56 on its outer end with its inner end connected by a fitting 57 to the sleeve 43 with the conduit 55 communicating with the groove 47. A bracket B secures the conduits 52, 55 to the arms 50. A passageway 58 extends through the shaft 26 and communicates with the groove 48. A passageway 59 extends through the shaft 26 and communicates with the groove 47.

A base member 60 is secured to the shaft 26 adjacent the collar 44 and has an electric motor 61 mounted thereon. A gear box 62 is driven by the electric motor 61 and drives a chain 63 engaged with the sprocket 46 to rotate the sleeve 43 on the shaft 26 to thus rotate the spray nozzles 53, 56. A disk 64 is secured to the shaft 26 by collar 65 and the disk 64 supports a concentric rim 66. An inflatable flexible tube 67 is supported in the rim 66 and has an inflation valve 68 extending outwardly therefrom through the rim 66. An inflation conduit 69 extends through the inflation valve 68 from the shaft 26.

A tank 70 forms part of the disk 64 and surrounds the shaft 26 as can be clearly seen in FIG. 13. The tank 70 has an outlet pipe 71 which communicates with a conduit 72 communicating with the conduit 58 in the shaft 26.

A closed circuit television camera 73 is supported on the tank 70 for observing the action of the apparatus 25. A filler cap 74 on the tank 70 provides means for replacing the liquid materials therein.

A sleeve 75 is journalled on bearings 76 on the shaft 26 between a pair of collars 77 secured to the shaft 26 by set screws 78. The sleeve 75 is provided with radially equi-spaced sockets 79 extending radially outwardly therefrom. The sleeve 75 also carries a sprocket 80 for reasons to be assigned.

A shaft 81 is mounted for radial reciprocating movement in each of the sockets 79 and is secured therein by pins 82 extending to slots 83 in the shafts 81. Each of the shafts 81 is provided with a U-shaped yoke 84 on the outer end thereof in which is journalled a roller 85. A coil spring 86 is seated in each of the sockets 79 to resiliently urge the rollers 85 into contact with the interior of a pipe.

A base member 87 is secured to the shaft 26 and has an electric motor 88 mounted thereon with its gear box 89. A drive chain 90 is driven by the motor 88 through the gear box 89 and drives the sprocket 80 to rotate the sleeve 75 and thus the rollers 85 as desired.

A disk 91 is secured to the shaft 26 by collars 92 and set screws 93. The disk 91 has a rim 94 concentrically mounted thereon to support a normally deflated tube 95 having a valve stem 96 and a conduit 97 extending from the valve stem 96 into the shaft 26. A wax tank 98 is mounted on the disk 91 and includes a discharge pipe 99 communicating with conduit 100 in the shaft 26 which also communicates with the conduit 59.

A sleeve 101 identical to the sleeve 43 is journalled on the shaft 26 between the collar 92 and a collar 102, secured by set screws 103. The sleeve 101 has a pair of oppositely extending arms 104 identical to the arms 50 and having brackets 105 secured to their outer ends. A conduit 106 is supported in the bracket 105 and has a spray nozzle 107 secured to one end thereof. The opposite end of the conduit 106 is connected through a fitting 108 to communicate with a groove 109 in the shaft 26 with the groove 109 communicating with the conduit 58. A conduit 110 is provided with a spray nozzle 111 on its outer end and has its inner end connected with a fitting 112 to a groove 113 in the shaft 26. The groove 113 communicates with the conduit 59.

A sprocket 114 is formed on the sleeve 101 and is driven through a drive chain 115 from a gear box 116 forming part of an electric motor (not shown) but identical to the motor 61.

The wax tank 98 is provided with a filler cap 117 to permit it to be filled as needed.

Electric wires 118 extend from the electric motors 61, 88 into the shaft 26 to provide power for the electric motors. Cables 119 extend from the closed circuit television cameras 42, 73 in the shaft 26 as can be seen in FIG. 13. Power and control cables 120 extend out of the shaft 26 at the end thereof to which the cable 30 is attached and these cables 120 are connected to a source of electricity, television monitoring screens, (not shown) an air compressor system indicated generally at 121. A cable 30 is connected to a power winch 122 for moving the apparatus 25 through the pipe P. The liner L before treatment is secured at one end of the pipe P by means of an inflatable internal clamp C. The opposite end of the liner L is held in place by an inflatable internal clamp C′ differing from the clamp C in that it has an aperture 123 normally closed by a rubber valve 124 to permit the cables 120 to pass therethrough.

Figure 4:
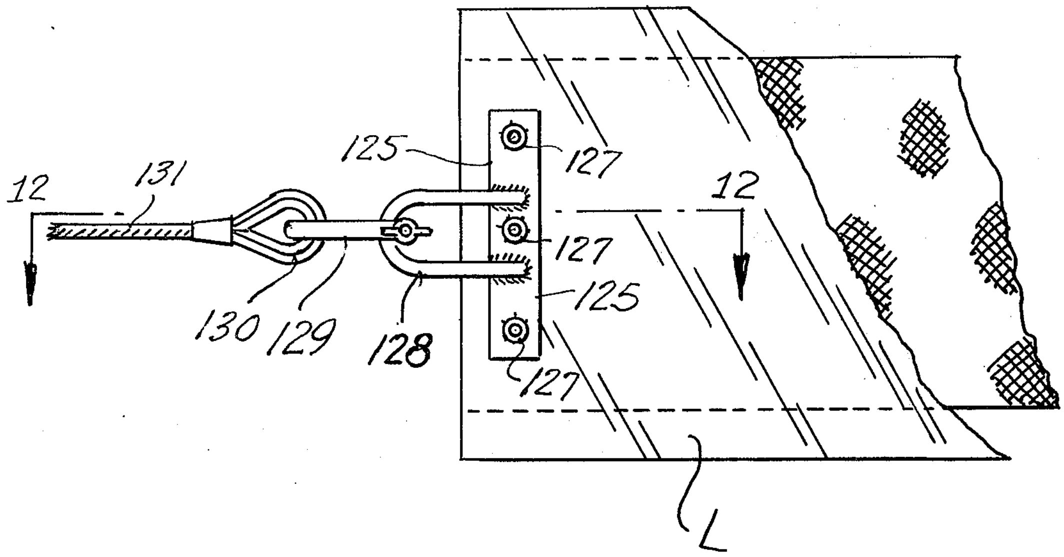
FIG. 4 is an enlarged plan view of the liner cable attachment taken along the line 4—4 of FIG. 2, looking in the direction of the arrows.
Figure 19:
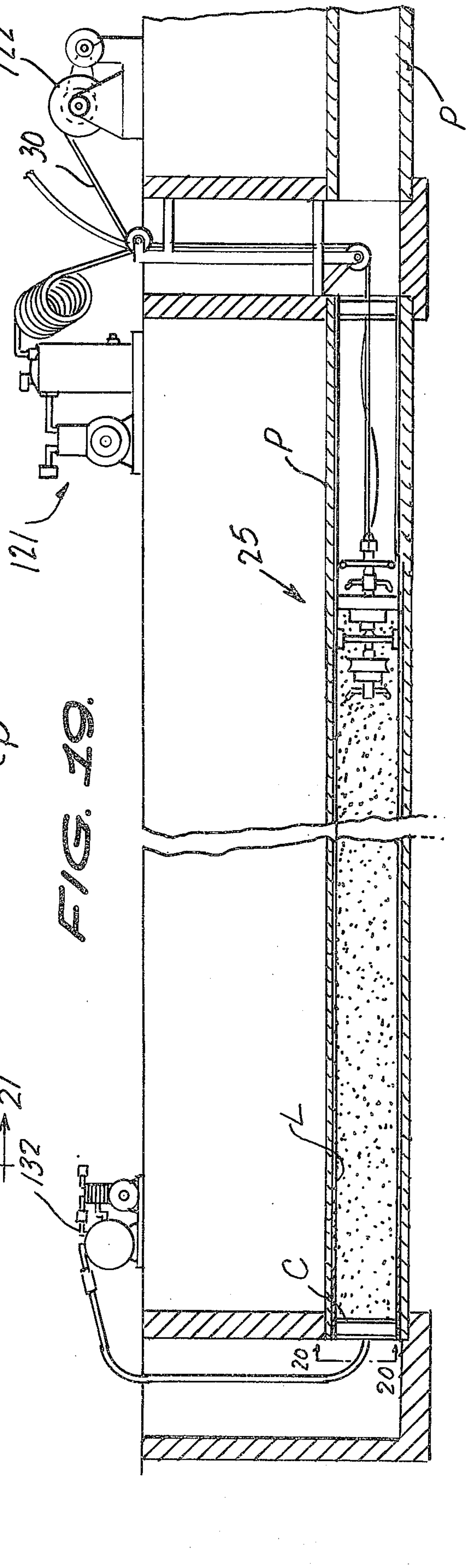
FIG. 19 is a longitudinal side elevation of the invention shown in a pipe line during a pipe lining operation.
Figure 22:
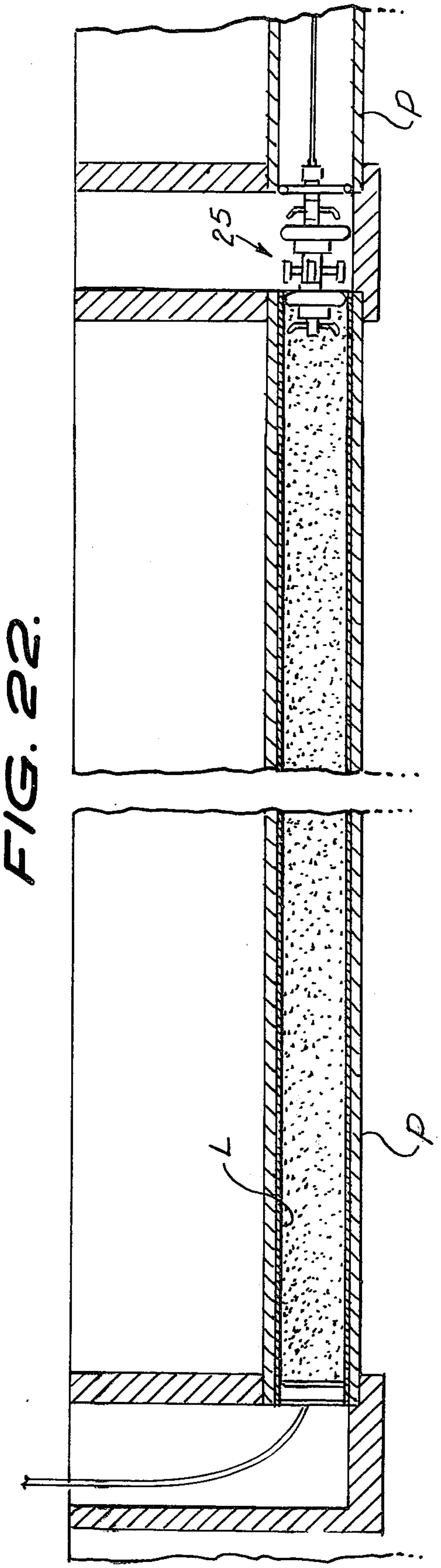
FIG. 22 is a view similar to FIG. 19 with the apparatus positioned for the curing of the liner.
Figure 23:
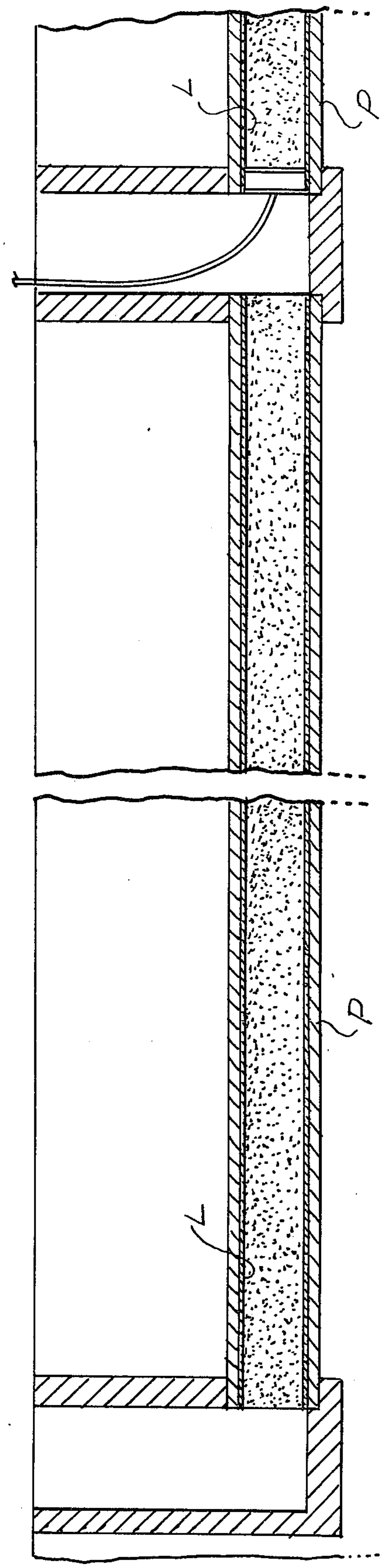
FIG. 23 is a view similar to FIG. 19 of a section of lined pipe with the next section of pipe in the process of being lined.

The liner L is folded as can be seen in FIGS. 4 and 12 and has a pair of plates 125, 126 secured to the opposite faces thereof by means of bolts 127. U-shaped eyes 128 are secured to the plates 125, 126 and extend in parallel relation to receive a clevis 129. The clevis 129 connects through an eye 130 on the end of a cable 131 used for pulling the liner into place in the pipe P. The clamps C, C′ are inflated respectively by the compressors 121 and 132 as can be seen in FIG. 19.

In FIGS. 6 through 10 and 24 the lining material is illustrated generally at L. The liner material L includes a polyvinyl sheet 133 having adhesive 134 on one surface thereof. Fiberglas roving 135 is adhered to the polyvinyl sheet 133 by the adhesive 134 after the protective backing 136 has been removed. A fiberglas matting 137 is adhered to the fiberglas roving by adhesive 138 to produce the basic liner L.

The liner L is formed into a cylinder by joining the opposed edges E so that the liner L is then ready to be attached to the cable 131 to be drawn into the pipe P.

The conduit 59 is connected to a source of liquid resin which is capable of being polymerized and the tank 70 is filled with a catalyst which will polymerize the resin. The tank 98 is filled with a wax which can be mixed with the resin to produce a finish coat. As the apparatus 25 moves in the pipe P the spray nozzles 56 spray the resin onto the liner L and simultaneously the spray nozzle 53 spray catalyst onto the resin. The tube 67 forces the resin and catalyst into and through the liner L completely saturating the fiberglas matting and the fiberglas roving. The nozzles 56, 53 are rotated with the arms 50 and sleeve 43 by the electric motors 61 and gear train 62. Rollers 85 with their axis parallel to the shaft 26 are rotated around the shaft 26 by the electric motor 88 and gear train 89 so that the rollers 85 compress the fiberglas matting, fiberglas roving, resin and catalyst as the apparatus 25 moves through the pipe.

The resin mixed with wax from the tank 98 flows through the nozzles 111 while the catalyst flows through the nozzles 107 to be sprayed onto the compressed liner L to thus provide a finished coat. The tube 95 is adapted to be inflated when it reaches the end of the liner L so as to support the liner L during an initial cure.

The major function of the instant invention is to line pipes in situ so as to convert low pressure leaking pipes to a high pressure non-leaking pipe while leaving the pipe in the ground. The same apparatus is useful in lining new pipe prior to installation in the field.

Having thus described the preferred embodiment of the invention it should be understood that numerous structural modifications and adaptations may be resorted to without departing from the spirit of the invention.

What is claimed is:

1. A pipe lining apparatus for applying a lining to a pipe comprising a longitudinal non-rotating shaft, means for moving said shaft longitudinally through a liner in a pipe, a plurality of radially adjustable rollers mounted on said shaft with the axis of each of said rollers extending perpendicularly to the line of movement of said apparatus through said pipe for guiding said shaft through said pipe, spray means journalled on said shaft adjacent said rollers for spraying resin and catalyst onto said liner, means mounted on said shaft for rotating said spray means about said shaft, inflatable means mounted on said shaft adjacent said spray means for forcing the resin and catalyst into said liner, and a plurality of compression rollers, means mounting said compression rollers for rotation about said shaft with the axis of said compression rollers parallel to the axis of said pipe for compressing said liner against said pipe.

2. A device as claimed in claim 1 including a second spray means on said shaft spaced from said first spray means for spraying a finish coating of resin, wax and catalyst onto said liner.

3. A device as claimed in claim 2 including a catalyst tank supported on said shaft for feeding said spray means and a wax tank supported on said shaft for feeding said second spray means.

4. A device as claimed in claim 1 including a catalyst tank supported on said shaft for feeding said spray means.

5. A device as claimed in claim 1 wherein said spray means includes a resin nozzle positioned on said spray means adjacent said liner and a catalyst nozzle positioned on said spray means adjacent said resin nozzle.

6. A device as claimed in claim 1 wherein the means mounting said compression rollers on said shaft includes an electric motor drive mounted on said shaft for rotating said mounting means about said shaft.

7. A device as claimed in claim 6 wherein said means mounting said compression rollers on said shaft includes means resiliently urging said rollers into compressing contact with said pipe.

8. An apparatus as claimed in claim 1 including closed circuit television means for observing the operation of said apparatus during a pipe lining function.

9. A device as claimed in claim 1 including an inflatable support on said shaft for clamping the end of said liner during initial curing.

* * * * *